(12) United States Patent
Tachibana et al.

(10) Patent No.: US 11,309,817 B2
(45) Date of Patent: Apr. 19, 2022

(54) CONTROL DEVICE OF ROTATING MACHINE, AND CONTROL DEVICE OF ELECTRIC VEHICLE

(71) Applicant: Mitsubishi Electric Corporation, Tokyo (JP)

(72) Inventors: Tomoya Tachibana, Tokyo (JP); Yoshihiko Kimpara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/284,996

(22) PCT Filed: Dec. 6, 2018

(86) PCT No.: PCT/JP2018/044908
§ 371 (c)(1),
(2) Date: Apr. 13, 2021

(87) PCT Pub. No.: WO2020/115859
PCT Pub. Date: Jun. 11, 2020

(65) Prior Publication Data
US 2021/0391814 A1    Dec. 16, 2021

(51) Int. Cl.
*H02P 21/00* (2016.01)
*H02P 21/18* (2016.01)
*H02P 21/22* (2016.01)

(52) U.S. Cl.
CPC ............. *H02P 21/18* (2016.02); *H02P 21/22* (2016.02)

(58) Field of Classification Search
CPC ................................. H02P 21/18; H02P 21/22
(Continued)

(56) References Cited

U.S. PATENT DOCUMENTS

2015/0244298 A1* 8/2015 Takaki .................. H02P 6/18
318/400.02
2015/0333682 A1* 11/2015 Amemiya ............... H02P 21/22
318/400.02
(Continued)

FOREIGN PATENT DOCUMENTS

JP          3312472 B2      8/2002
JP       2009-290929 A    12/2009

OTHER PUBLICATIONS

International Search Report for PCT/JP2018/044908 dated Mar. 5, 2019 (PCT/ISA/210).

*Primary Examiner* — Erick D Glass
(74) *Attorney, Agent, or Firm* — Sughrue Mion, PLLC; Richard C. Turner (57) ABSTRACT

Provided is a control device for a rotating machine including a magnetic pole position estimation unit, a vector calculation unit, a current command correction unit configured to correct a first d-axis current command and a first q-axis current command, to thereby output a second d-axis current command and a second q-axis current command, a voltage application unit configured to superimpose a high-frequency voltage including a specific frequency component on voltage commands on rotational coordinates. The magnetic pole position estimation unit is configured to estimate the position of the magnetic pole based on a state quantity of the specific frequency component. The current command correction unit is configured to correct the current commands so that a current amplitude of electrical angle frequency components is equal to or larger than a half of a current amplitude of the specific frequency component.

7 Claims, 7 Drawing Sheets

(58) Field of Classification Search
USPC .................................................. 318/400.02
See application file for complete search history.

(56) References Cited

U.S. PATENT DOCUMENTS

| | | | |
|---|---|---|---|
| 2017/0085201 A1* | 3/2017 | Kakihara | H02K 1/146 |
| 2019/0044467 A1* | 2/2019 | Shimamoto | H02P 6/18 |
| 2021/0273591 A1* | 9/2021 | Tobari | H02P 21/16 |

* cited by examiner

CONTROL DEVICE OF ROTATING MACHINE, AND CONTROL DEVICE OF ELECTRIC VEHICLE

CROSS REFERENCE TO RELATED APPLICATIONS

This application is a National Stage of International Application No. PCT/JP2018/044908 filed Dec. 6, 2018.

TECHNICAL FIELD

The present invention relates to a control device for a rotating machine, which is configured to estimate a magnetic pole position of a rotor to control a rotating machine, and a control device for an electrically driven vehicle.

BACKGROUND ART

Hitherto, as a control device for a rotating machine, there has been given a control device which is configured to accurately recognize a rotor speed or rotor position of a rotating machine, and to cause currents to flow through windings at appropriate timings based on the position or the number of rotations of the rotor, to thereby generate a driving force through attractive forces and repulsive forces of magnets. As a related-art control device for a rotating machine, there has been known a control device including a sensor, for example, an encoder or a resolver, in order to recognize speed information or position information on the rotor.

In a configuration in which a position sensor or a speed sensor is provided for a rotating machine, it is possible to accurately obtain the rotor speed information or the rotor position information on the rotating machine. Meanwhile, there exist, for example, a problem of an increase in cost due to the sensor, a problem of a need for wires for transmitting the sensor information to the control device, and a problem of a decrease in reliability due to a failure of the sensor itself.

To address the problem, as a configuration to solve the above-mentioned problems, there has been developed a so-called position sensor-less control method of estimating the rotor position of the rotating machine from voltages applied to the rotating machine or currents flowing through the rotating machine. As a control method relating to the sensor-less control in the rotating machine, there is a method of estimating the rotor position of the rotating machine from an induced voltage of the rotating machine.

There is such a characteristic that a magnitude of the induced voltage is proportional to the speed of the rotating machine. For that reason, the induced voltage is low at a zero speed or in a low-speed range, and an S/N ratio thus deteriorates. As a result, it is difficult to estimate the rotor position of the rotating machine at the zero speed or in the low-speed range.

Moreover, as another configuration to solve the above-mentioned problems, there is a control method of using magnetic saliency of the rotor to superimpose a high-frequency signal for estimating the position, to thereby increase a precision of the estimation of the rotor position based on the superimposed high-frequency signal. This method requires the input of the high-frequency signal for the position estimation to the rotating machine, but the method has such an advantage that the rotor position of the rotating machine can be estimated independently of the speed of the rotating machine. For this reason, the sensor-less control method using the saliency is used to detect the position at the zero speed and in the low-speed range.

As the sensor-less control method using the saliency, there has been proposed a control method of estimating an electrical angle of a rotating machine based on current signals at a specific frequency actually propagating to the rotating machine when there is applied a high-frequency voltage signal oscillating in a positive direction and a negative direction of an estimated "d" axis of a three-phase rotating machine (for example, see Patent Literature 1). However, at no load or low load under which a current amplitude is small, there is such a problem that the estimation of the rotor position is difficult due to deterioration of a precision of detection signals and a voltage error caused by a deadtime.

Thus, as a method of increasing the estimation precision of the rotor position at no load or low load, there is a method of offsetting a d-axis current command value from a current vector defined on a torque maximizing curve toward a negative direction so that a c-axis current command value is corrected to a value equal to or larger than a lower limit value. Through adoption of this control method, there is achieved a control device that suppresses the influence of the deterioration of the precision of the detection signals (for example, see Patent Literature 2).

CITATION LIST

Patent Literature

[PTL 1] JP 3312472 B2
[PTL 2] JP 2009-290929 A

SUMMARY OF INVENTION

Technical Problem

A control device for a rotating electric machine as described in Patent Literature 2 includes, in order to suppress the deterioration of the estimation precision of the rotor position, an upper-limit-value control unit configured to limit an upper limit of the d-axis current command value to zero or a negative value, to thereby correct the d-axis current command value. However, in order to calculate a correction amount for the d-axis current command value, it is assumed that experiments and the like are executed in advance to set the correction amount that suppresses the deterioration of the estimation precision of the rotor position.

It is desired that the correction amount for the d-axis current command value can easily be determined for various types of rotating machines. When the correction amount for the d-axis current command value is too small, the estimation precision of the rotor position deteriorates.

Meanwhile, when the correction amount for the d-axis current command value is too large, the d-axis current command value deviates from a current value that maximizes the torque. As a result, such a large correction amount induces a decrease in efficiency, and may further induce irreversible demagnetization of permanent magnets arranged in the rotor.

Moreover, when an operation environment of the rotating machine changes or when parameters fluctuate due to manufacturing errors, the related art has such a problem that the deterioration of the estimation precision of the rotor position cannot be suppressed.

The present invention has been made to solve the above-mentioned problems, and has an object to provide a control device for a rotating machine, which is capable of suppressing deterioration of an estimation precision of a rotor position, and a control device for an electrically driven vehicle.

Solution to Problem

According to one embodiment of the present invention, there is provided a control device for a rotating machine including: a magnetic pole position estimation unit configured to estimate a position of a magnetic pole of a rotor based on a state quantity of the rotating machine; a vector calculation unit which is configured to obtain a magnetic pole position estimated value which is an estimation result obtained by the magnetic pole position estimation unit, and to generate a d-axis current and a q-axis current based on a detection result of a phase current in each phase flowing through the rotating machine; a current command correction unit configured to correct a first d-axis current command and a first q-axis current command, to thereby output a second d-axis current command and a second q-axis current command; a current control unit configured to generate voltage commands on rotational coordinates so that the d-axis current matches the second d-axis current command and the q-axis current matches the second q-axis current command; a voltage application unit configured to superimpose, on the voltage commands on the rotational coordinates, a high-frequency voltage including a specific frequency component at a high frequency with respect to electrical angle frequency components in synchronization with the number of rotations of the rotating machine; and a voltage control unit which is configured to obtain the magnetic pole position estimated value, and to convert the voltage commands on the rotational coordinates after the superimposition by the voltage application unit to voltage commands on fixed coordinates, to thereby control voltages to be applied to the rotating machine, wherein the magnetic pole position estimation unit is configured to estimate the position of the magnetic pole based on a state quantity of the specific frequency component, and wherein the current command correction unit is configured to correct the first d-axis current command and the first q-axis current command so that a current amplitude of the electrical angle frequency components is equal to or larger than a half of a current amplitude of the specific frequency component, to thereby output the second d-axis current command and the second q-axis current command.

Further, according to one embodiment of the present invention, there is provided a control device for an electrically driven vehicle including the control device for a rotating machine of the present application.

Advantageous Effects of Invention

According to the present invention, it is possible to provide the control device for a rotating machine configured to suppress the deterioration of the estimation precision of the rotor position, and the control device for an electrically driven vehicle.

DESCRIPTION OF EMBODIMENTS

First Embodiment

Figure 1:
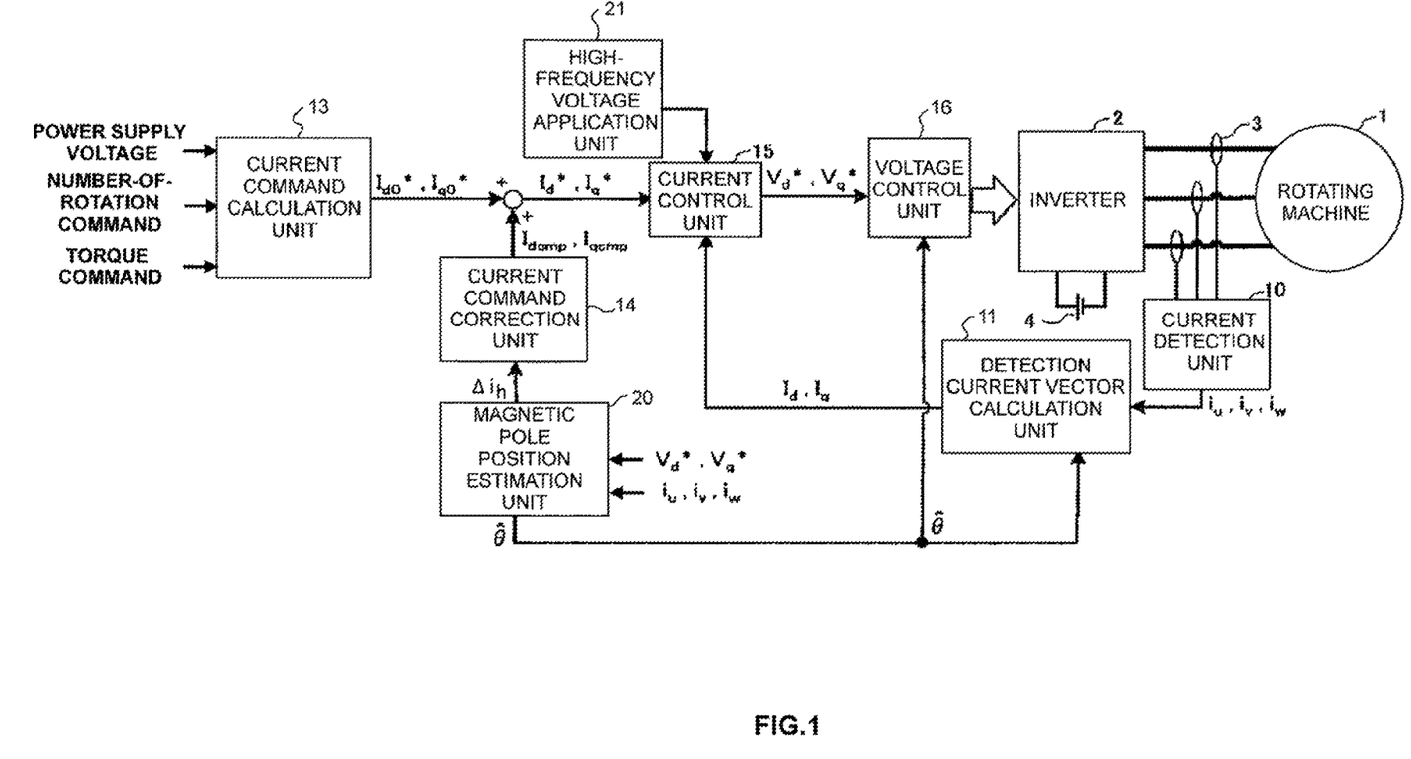
FIG. 1 is a block diagram for illustrating a configuration relating to a control device for a rotating machine according to a first embodiment of the present invention.

FIG. 1 is a block diagram for illustrating a configuration relating to a control device for a rotating machine according to a first embodiment of the present invention. The control device for a rotating machine according to the first embodiment is applicable not only to rotating machines used in electrically driven vehicles such as electric vehicles and hybrid vehicles, but also to drive systems using any types of rotating machines.

A detailed description is now given of each component of FIG. 1. A rotating machine 1 is supplied with a current through an inverter 2 configured to invert a DC to an AC, to thereby be driven. A current sensor 3 configured to detect currents in three phases is provided on an AC side of the inverter 2. A DC power supply 4 is connected to a DC side of the inverter 2.

The rotating machine 1 is formed of a three-phase AC rotating machine such as a permanent magnet synchronous rotating machine, an induction rotating machine, or a reluctance rotating machine. As permanent magnets used for a rotor of the permanent magnet synchronous rotating machine, a rare-earth magnet, for example, neodymium, is used. However, the permanent magnet may be another type of magnet such as a samarium cobalt magnet or a ferrite magnet.

The inverter 2 is formed of, for example, six power switching elements and diodes each connected in parallel to the power switching element. As the power switching element, for example, an insulated gate bipolar transistor (IGBT) can be used.

A DC voltage smoothed by a smoothing capacitor is supplied to the inverter 2. Moreover, the inverter 2 inverts the DC voltage to AC voltages based on an output signal from a voltage control unit 16, and supplies the AC voltages to the rotating machine 1, which is the AC rotating machine, to thereby drive the rotating machine 1.

The current sensor 3 detects the three-phase currents supplied from the inverter 2 serving as a power converter to the rotating machine 1. The current sensor 3 is only required to be provided for at least two phases. The current detection unit 10 can obtain a current in the remaining one phase through calculation assuming that a sum of the currents in the three phases is zero. In the following, description is given while assuming that the AC currents in the three phases are detected by the current sensor 3 as illustrated in FIG. 1.

The current detection unit 10 detects output signals corresponding to the three-phase currents output by the current sensor 3 based on detection cycles. Three-phase currents $i_u$, $i_v$, and $i_w$ detected by the current detection unit 10 at each detection cycle are input to a detection current vector calculation unit 11.

The DC power supply 4 is formed of a rechargeable battery such as a lead battery, nickel hydrogen, or lithium ion. There may be employed such a configuration that a DC/DC converter, which is configured to step up or step down the output voltage of the DC power supply 4 to supply the stepped-up or stepped-down voltage to the inverter 2, is further connected.

The detection current vector calculation unit 11 serving as a vector calculation unit reads, as input signals, a magnetic pole position estimated value $\hat{\theta}$, which is an estimation result obtained by a magnetic pole position estimation unit 20 described in detail later, and the three-phase currents $i_u$, $i_v$, and $i_w$, which are the detection results obtained by the current detection unit 10. A notation of "^" herein indicates that "^" is added over a corresponding symbol, and means that the symbol represents an estimated value. The magnetic pole position estimated value $\hat{\theta}$ is a value corresponding to an estimated rotor position.

The detection current vector calculation unit 11 converts the three-phase currents $i_u$, $i_v$, and $i_w$ to a d-axis current and a q-axis current, which are currents on rotational coordinates defined by a "d" axis and a "q" axis and rotating in synchronization with a rotational speed, based on the magnetic pole position estimated value $\hat{\theta}$. Further, the detection current vector calculation unit 11 cuts a high-frequency current including a specific frequency component from the d-axis current and q-axis current after the conversion, to thereby extract electrical angle frequency components in synchronization with the number of rotations, and supplies the extracted electrical angle frequency components as a d-axis current $I_d$ and a q-axis current $I_q$ to the current control unit 15.

A current command calculation unit 13 calculates a d-axis current command $I_{d0}*$ and a q-axis current command $I_{q0}*$, which are current command values in a rotational coordinate system, based on a power supply voltage, a number-of-rotation command, and a torque command. The d-axis current command $I_{d0}*$ corresponds to a first d-axis current command. The q-axis current command $I_{q0}*$ corresponds to a first q-axis current command.

A current command correction unit 14 calculates a d-axis current command correction amount $I_{dcmp}$ and a q-axis current command correction amount $I_{qcmp}$, which are correction amounts for the current command values in the rotational coordinate system, based on a difference value $\Delta i_h$ output from the magnetic pole position estimation unit 20.

A d-axis current command $I_d*$ is generated by adding the d-axis current command correction amount $I_{dcmp}$, which is the output of the current command correction unit 14, to the d-axis current command $I_{d0}*$, which is the output of the current command calculation unit 13. Similarly, a q-axis current command $I_q*$ is generated by adding the q-axis current command correction amount $I_{qcmp}$, which is the output of the current command correction unit 14, to the q-axis current command $I_{q0}*$, which is the output of the current command calculation unit 13. The d-axis current command $I_d*$ corresponds to a second d-axis current command. The q-axis current command $I_q*$ corresponds to a second q-axis current command.

The current control unit 15 reads the d-axis current command $I_d*$ and the q-axis current command $I_q*$ as command values, and reads the d-axis current $I_d$ and the q-axis current $I_q$ output from the detection current vector calculation unit 11 as feedback values. The current control unit 15 calculates a difference between the d-axis current command $I_d*$ and the d-axis current $I_d$ and a difference between the q-axis current command $I_q*$ and the q-axis current $I_q$. After that, the current control unit 15 executes proportional integral control so as to eliminate each of the current differences, to thereby calculate voltage commands on the rotational coordinates. That is, the current control unit 15 executes current feedback control, and consequently generates the voltage commands on the rotational coordinates as voltage command vectors.

A high-frequency voltage application unit 21 serving as a voltage application unit outputs, to the current control unit 15, a high-frequency voltage including the specific frequency component to be applied to the voltage commands so as to be superimposed, in order to estimate the magnetic pole position. After that, the current control unit 15 outputs, to the voltage control unit 16, voltage commands $V_d*$ and $V_q*$ obtained by superimposing the high-frequency voltage including the specific frequency component on the calculated voltage commands on the rotational coordinates.

The voltage control unit 16 uses the magnetic pole position estimated value $\hat{\theta}$ to convert the voltage commands $V_d*$ and $V_q*$ superimposed with the high-frequency voltage including the specific frequency component to three-phase voltage commands $V_u*$, $V_v*$, and $V_w*$ on fixed coordinates, and outputs the converted three-phase voltage commands $V_u*$, $V_v*$, and $V_w*$ to the inverter 2.

As the voltage commands to be superimposed with the high-frequency voltage including the specific frequency component, the three-phase voltage commands may be used in place of the voltage commands on the rotational coordinates. That is, the high-frequency voltage including the specific frequency component is only required to be superimposed on the voltage command values of one of the voltage commands on the rotational coordinates and the three-phase voltage commands.

Figure 2:
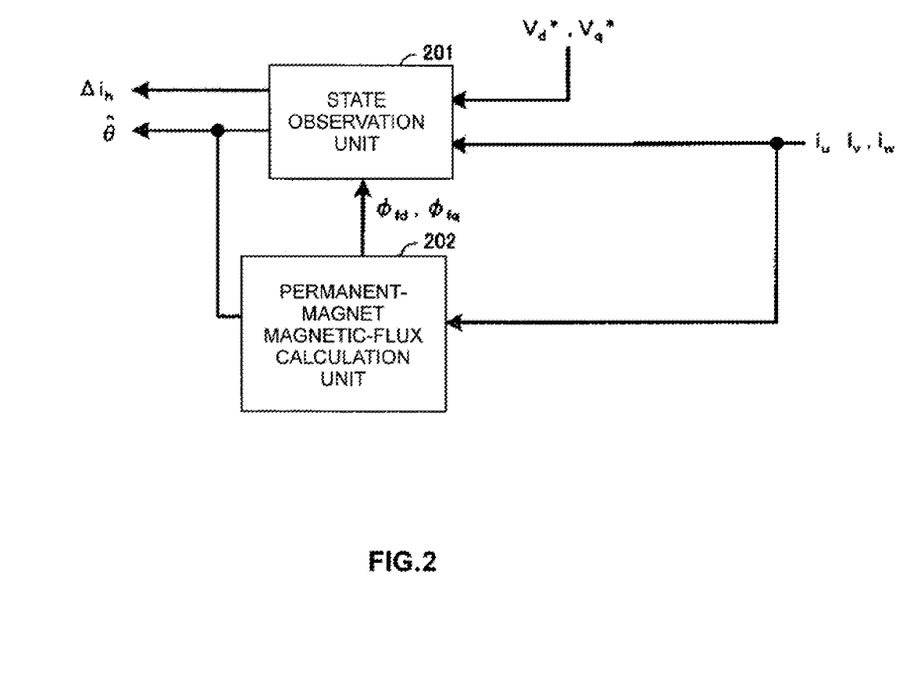
FIG. 2 is a block diagram for illustrating a configuration relating to a magnetic pole position estimation unit in the first embodiment of the present invention.

FIG. 2 is a block diagram for illustrating a configuration relating to the magnetic pole position estimation unit 20 in the first embodiment of the present invention. With reference to FIG. 2, description is given of the magnetic pole position estimation unit 20. A state observation unit 201 obtains the voltage commands $V_d*$ and $V_q*$ on the rotational coordinates superimposed with the high-frequency voltage including the specific frequency component and the three-phase currents $i_u$, $i_v$, and $i_w$ detected by the current detection unit 10 as state quantities of the rotating machine 1, and estimates the magnetic pole position estimated value $\hat{\theta}$ from the state quantities.

Moreover, the state observation unit 201 obtains a current amplitude of the specific frequency component from the voltage commands $V_d*$ and $V_q*$ superimposed with the high-frequency voltage including the specific frequency component. After that, the state observation unit 201 obtains the difference value $\Delta i_h$, between a current amplitude of the electrical angle frequency components and a half of the current amplitude of the specific frequency component, and outputs the obtained difference value $\Delta i_h$, to the current command correction unit 14.

A permanent-magnet magnetic-flux calculation unit 202 calculates permanent magnet magnetic flux vectors $\varphi_{fd}$ and $\varphi_{fq}$ at a zero speed and in a low-speed range in which induced voltages are low, and outputs the permanent magnet magnetic flux vectors $\varphi_{fd}$ and $\varphi_{fq}$ to the state observation unit 201. The state observation unit 201 executes calculation for correcting a rotor position error. As a result, it is possible to suppress deterioration of a position estimation precision also at the zero speed and in the low-speed range.

Figure 3:
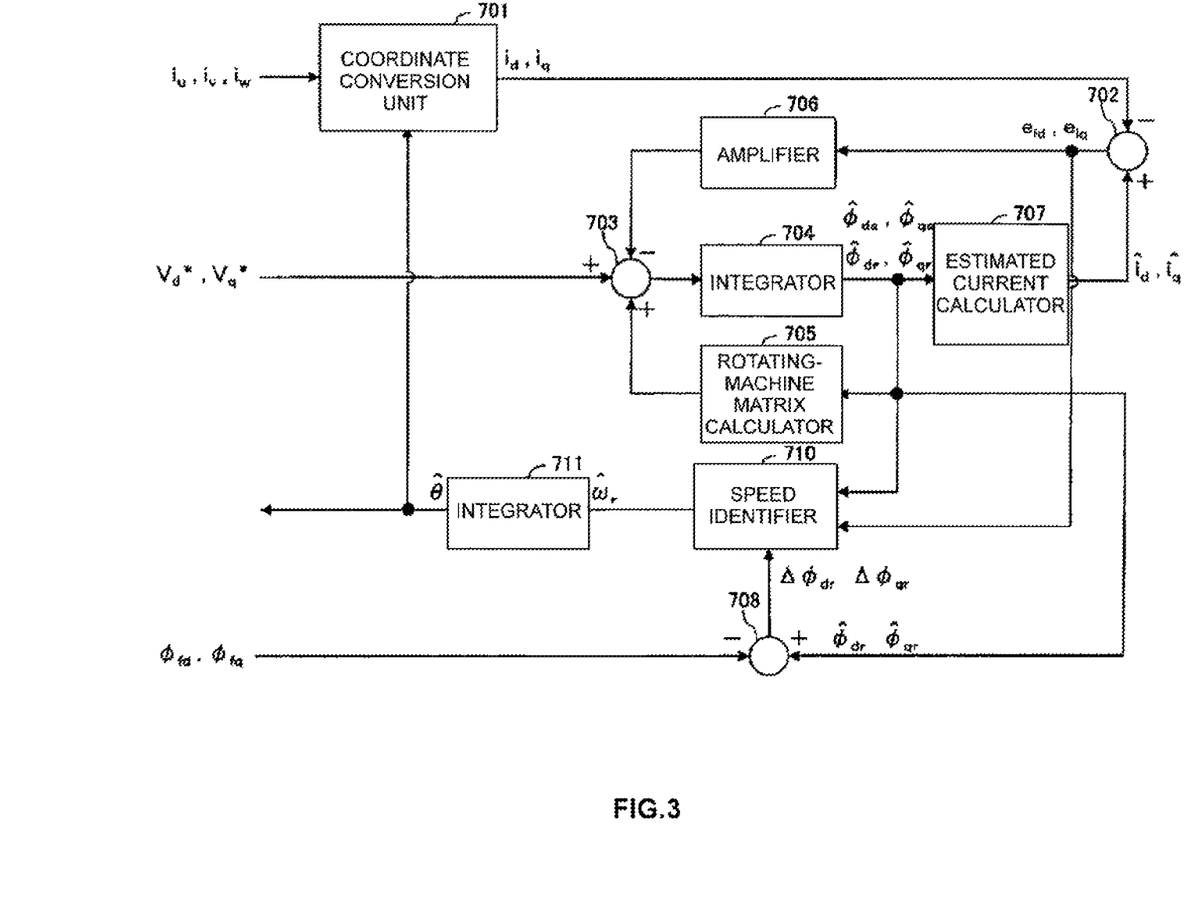
FIG. 3 is a block diagram for illustrating a configuration for obtaining a magnetic pole position estimated value relating to a state observation unit in the first embodiment of the present invention.

FIG. 3 is a block diagram for illustrating a configuration for obtaining the magnetic pole position estimated value $\hat{\theta}$ relating to the state observation unit 201 in the first embodiment of the present invention. With reference to FIG. 3, description is given of calculation processing for the magnetic pole position estimated value $\hat{\theta}$ by the state observation unit 201. A coordinate converter 701 executes the same processing as that executed by the detection current vector calculation unit 11. That is, the coordinate convertor 701 uses the magnetic pole position estimated value $\hat{\theta}$ to convert the three-phase currents $i_u$, $i_v$, and $i_w$, which are the output of the current detection unit 10, to currents $i_d$ and $i_q$ on rotational coordinates defined by the "d" axis and the "q" axis rotating in synchronization with a rotational speed estimated value $\hat{\omega}_r$.

In the first embodiment, in order to satisfy those conditions, there is provided a configuration that applies, to a numerical model of the rotating machine 1, an α-axis voltage command $V_\alpha^*$ and a β-axis voltage command $V_\beta^*$ obtained by converting the three-phase voltage commands $V_u^*$, $V_v^*$, and $V_w^*$ to stationary Cartesian coordinates referred to as "α coordinate" and "β coordinate" and an α-axis current $I_\alpha$ and a β-axis current $I_\beta$ obtained by converting the three-phase currents $i_u$, $i_v$, and $i_w$ to currents on the α axis and the β axis, to thereby calculate the rotor position. Expression (1) is a voltage equation of the rotating machine 1 on the α axis and the β axis.

$$\begin{bmatrix} V_\alpha^* \\ V_\beta^* \end{bmatrix} = \begin{bmatrix} R + \frac{d}{dt}L_\alpha & \frac{d}{dt}L_{\alpha\beta} \\ \frac{d}{dt}L_{\alpha\beta} & R + \frac{d}{dt}L_\beta \end{bmatrix} \begin{bmatrix} i_\alpha \\ i_\beta \end{bmatrix} + \begin{bmatrix} E_\alpha \\ E_\beta \end{bmatrix} \quad (1)$$

$$\begin{pmatrix} E_\alpha = -\omega_r \phi_f \sin\theta_{re}, E_\beta = \omega_r \phi_f \cos\theta_{re} \\ L_\alpha = L + l\cos(2\theta_{re}), L_\beta = L - l\cos(2\theta_{re}) \\ L_{\alpha\beta} = l\sin(\theta_{re}) \\ L = \frac{L_d + L_q}{2}, l = \frac{L_d - L_q}{2} \end{pmatrix}$$

$V_\alpha^*$ and $V_\beta^*$, $I_\alpha$ and $I_\beta$ can be obtained by Expression (2) and Expression (3), respectively.

$$\begin{bmatrix} V_\alpha^* \\ V_\beta^* \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} V_u^* \\ V_v^* \\ V_w^* \end{bmatrix} \quad (2)$$

$$\begin{bmatrix} i_\alpha \\ i_\beta \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ i_w \end{bmatrix} \quad (3)$$

Symbols $E_\alpha$ and $E_\beta$ of Expression (1) represent induced voltages generated by the rotation of the rotating machine 1. Those induced voltages can be obtained as represented by Expression (4) through transformation of Expression (1).

$$\begin{bmatrix} E_\alpha \\ E_\beta \end{bmatrix} = \begin{bmatrix} V_\alpha^* \\ V_\beta^* \end{bmatrix} - \begin{bmatrix} R + \frac{d}{dt}L_\alpha & \frac{d}{dt}L_{\alpha\beta} \\ \frac{d}{dt}L_{\alpha\beta} & R + \frac{d}{dt}L_\beta \end{bmatrix} \begin{bmatrix} i_\alpha \\ i_\beta \end{bmatrix} \quad (4)$$

Regarding the "d" axis, an adder/subtractor 702 outputs, to an amplifier 706 and a speed identifier 710, a current difference $e_{id}$ obtained by subtracting the d-axis current $i_d$ on the "d" axis and the "q" axis from an estimated current $\hat{i_d}$ on the rotational coordinates defined by the "d" axis and the "q" axis, which is output of an estimated current calculator 707 described later. Similarly, regarding the "q" axis, the adder/subtractor 702 outputs, to the amplifier 706 and the speed identifier 710, a current difference $e_{iq}$ obtained by subtracting the q-axis current $i_q$ on the "d" axis and the "q" axis from an estimated current $\hat{i_q}$ on the rotational coordinates defined by the "d" axis and the "q" axis, which is output of the estimated current calculator 707.

A rotating-machine matrix calculator 705 is configured to use a matrix A represented by Expression (5) to execute calculation for input. Moreover, the amplifier 706 is configured to use a matrix H represented by Expression (6) to execute calculation for input.

$$A = \begin{pmatrix} -\frac{R}{L_d} & \omega & 0 & \omega r \\ -\omega & -\frac{R}{L_q} & -\omega r & 0 \\ 0 & 0 & 0 & \omega - \omega r \\ 0 & 0 & -\omega + \omega r & 0 \end{pmatrix} \quad (5)$$

$$H = \begin{bmatrix} h_{11} & h_{12} \\ h_{21} & h_{22} \\ h_{31} & h_{32} \\ h_{41} & h_{42} \end{bmatrix} \quad (6)$$

In Expression (5), a rotor angular speed ω is unknown. For this reason, the rotor angular speed ω is substituted by the rotational speed estimated value $\hat{\omega}_r$, which is output of the speed identifier 710 described later.

Calculation satisfying a relationship represented by Expression (7) can be executed by using an adder/subtractor 703, an integrator 704, the rotating-machine matrix calculator 705, and the amplifier 706.

$$\frac{d}{dt} \begin{bmatrix} \hat{\phi}_{ds} \\ \hat{\phi}_{qs} \\ \hat{\phi}_{dr} \\ \hat{\phi}_{qr} \end{bmatrix} = A \begin{bmatrix} \hat{\phi}_{ds} \\ \hat{\phi}_{qs} \\ \hat{\phi}_{dr} \\ \hat{\phi}_{qr} \end{bmatrix} + \begin{bmatrix} 1 & 0 \\ 0 & 1 \\ 0 & 0 \\ 0 & 0 \end{bmatrix} \begin{bmatrix} V_d * \\ V_q * \end{bmatrix} - H \begin{bmatrix} e_{id} \\ e_{iq} \end{bmatrix} \quad (7)$$

Finally, the integrator 704 integrates a calculation result of values on the right side of Expression (7), to thereby generate stator magnetic flux estimated values $\hat{\varphi}_{ds}$ and $\hat{\varphi}_{qs}$ and rotor magnetic flux estimated values $\hat{\varphi}_{dr}$ and $\hat{\varphi}_{qr}$ of the rotating machine. The integrator 704 inputs the stator magnetic flux estimated values $\hat{\varphi}_{ds}$ and $\hat{\varphi}_{qs}$ and the rotor magnetic flux estimated values $\hat{\varphi}_{dr}$ and $\hat{\varphi}_{qr}$ to the rotating-machine matrix calculator 705 and the estimated current calculator 707. Moreover, the integrator 704 outputs the rotor magnetic flux estimated values $\varphi_{dr}\hat{}$ and $\varphi_{qr}\hat{}$ to the adder/subtractor 708 and the speed identifier 710.

The estimated current calculator 707 executes calculation represented by Expression (8) for the output of the integrator 704, and outputs the estimated currents $i_d\hat{}$ and $i_q\hat{}$ on the "d" axis and the "q" axis to the adder/subtractor 702.

$$\begin{bmatrix} \hat{i}_d \\ \hat{i}_q \end{bmatrix} = \begin{bmatrix} \frac{1}{L_d} & 0 & 0 & 0 \\ 0 & \frac{1}{L_q} & 0 & 0 \\ 0 & 0 & 0 & 0 \\ 0 & 0 & 0 & 0 \end{bmatrix} \begin{bmatrix} \hat{\phi}_{ds} \\ \hat{\phi}_{qs} \\ \hat{\phi}_{dr} \\ \hat{\phi}_{qr} \end{bmatrix} \quad (8)$$

Regarding the "d" axis, the adder/subtractor 708 outputs to the speed identifier 710 a rotor magnetic flux error $\Delta\varphi_{dr}$ obtained by subtracting the permanent magnet magnetic flux vector $\varphi_{fd}$ from the rotor magnetic flux estimated value $\varphi_{dr}\hat{}$. Similarly, regarding the "q" axis, the adder/subtractor 708 outputs to the speed identifier 710 a rotor magnetic flux error $\Delta\varphi_{qr}$ obtained by subtracting the permanent magnet magnetic flux vector $\varphi_{fq}$ from the rotor magnetic flux estimated value $\varphi_{qr}\hat{}$.

The speed identifier 710 uses the rotor magnetic flux estimated values $\varphi_{dr}\hat{}$ and $\varphi_{qr}\hat{}$, the current differences $e_{id}$ and $e_{iq}$, and the rotor magnetic flux errors $\Delta\varphi_{dr}$ and $\Delta\varphi_{qr}$ to calculate the rotational speed estimated value $\omega_r\hat{}$.

Expression (9) is an example of an arithmetic expression to be used when the rotational speed estimated value $\omega_r\hat{}$ is obtained through use of the rotor magnetic flux estimated values $\varphi_{dr}\hat{}$ and $\varphi_{qr}\hat{}$ and the current differences $e_{id}$ and $e_{iq}$ without considering the rotor magnetic flux errors $\Delta\varphi_{dr}$ and $\Delta\varphi_{qr}$. As represented by Expression (9), there is provided a configuration capable of indirectly obtaining the rotational speed estimated value $\omega_r\hat{}$ by executing proportional integral control through use of a proportional gain $K_p$, and an integral gain $K_i$.

$$\hat{\omega}_r = k_p\left(1 + \frac{k_i}{s}\right)\frac{e_{iq}\cdot\hat{\phi}_{dr} - e_{id}\cdot\hat{\phi}_{qr}}{\hat{\phi}_{dr}^2 + \hat{\phi}_{qr}^2} \quad (9)$$

Moreover, in general, a direction of a rotor magnetic flux vector is matched with the "d" axis, and the rotor magnetic flux estimated value of the "q" axis is thus $\varphi_{qr}\hat{}=0$. As a result, Expression (9) can be transformed to Expression (10). It is understood from Expression (10) that the rotational speed estimated value $\omega_r\hat{}$ is indirectly calculated by providing the proportional integral control so that $e_{iq}/\varphi_{dr}\hat{}$ is zero.

$$\hat{\omega}_r = k_p\left(1 + \frac{k_i}{s}\right)\frac{e_{iq}}{\hat{\phi}_{dr}} \quad (10)$$

A case in which the rotational speed estimated value $\omega_r\hat{}$ is obtained as represented by Expression (9) or Expression (10) is considered. In this case, as described above, an error occurs in the magnetic pole position estimated value $\theta\hat{}$ due to an estimation delay of the proportional integral control under a transient state, for example, a quick change in speed.

Moreover, all of the rotor magnetic flux estimated values $\varphi_{dr}\hat{}$ and $\varphi_{qr}\hat{}$ and the current differences $e_{id}$ and $e_{iq}$ used for Expression (9) or Expression (10) are obtained through the coordinate conversion that uses the magnetic pole position estimated value $\theta\hat{}$. For this reason, those values obtained through the coordinate conversion that uses the magnetic pole position estimated value $\theta\hat{}$ containing the error also contain errors caused by the error of the magnetic pole position estimated value $\theta\hat{}$.

Further, there is formed such a loop that the rotational speed estimated value $\omega_r\hat{}$ is calculated by applying the proportional integral control to the values containing the errors and the rotational speed estimated value $\omega_r\hat{}$ is then used to calculate again the magnetic pole position estimated value $\theta\hat{}$. As a result, the speed estimation and the position estimation are liable to become unstable. As a result, the proportional gain $K_p$ and the integral gain $K_i$ cannot be set to large values. That is, it is difficult to increase an estimation response of the rotational speed estimated value $\omega_r\hat{}$.

Thus, in the speed identifier 710 in the first embodiment, the rotor magnetic flux errors $\Delta\varphi_{dr}$ and $\Delta\varphi_{qr}$ are taken into consideration to increase the estimation response. Specifically, as represented by Expression (11), the speed identifier 710 in the first embodiment uses the rotor magnetic flux errors $\Delta\varphi_{dr}$ and $\Delta\varphi_{qr}$ calculated as the differences between the permanent magnet magnetic flux vectors $\varphi_{fd}$ and $\varphi_{fq}$ calculated by the permanent-magnet magnetic-flux calculation unit 202 and the rotor magnetic flux estimated values $\varphi_{dr}\hat{}$ and $\varphi_{qr}\hat{}$, which are the output of the integrator 704, respectively, to execute the proportional integral control.

The permanent-magnet magnetic-flux calculation unit 202 can use Expression (12) to obtain the permanent magnet magnetic flux vectors $\varphi_{fd}$ and $\varphi_{fq}$. In Expression (12), $\varphi_f$ represents a permanent magnet magnetic flux, and $\Delta\theta$ represents a rotor magnetic pole position error.

$$\hat{\omega}_r = k_p\left(1 + \frac{k_i}{s}\right)\frac{e_{iq}\cdot\hat{\phi}_{dr} - e_{id}\cdot\hat{\phi}_{qr} - k_{fd}\cdot\Delta\phi_{dr}\cdot\hat{\phi}_{dr} + k_{fq}\cdot\Delta\phi_{qr}\cdot\hat{\phi}_{qr}}{\hat{\phi}_{dr}^2 + \hat{\phi}_{qr}^2} \quad (11)$$

$$\begin{bmatrix} \Phi_{fd} \\ \Phi_{fq} \end{bmatrix} = \begin{bmatrix} \Phi_f\cos\Delta\theta \\ \Phi_f\sin\Delta\theta \end{bmatrix} \quad (12)$$

In the method of superimposing the specific frequency component used for the magnetic pole position estimation on the voltage commands on the rotational coordinates, when an error exists between a direction in which the specific frequency component is applied and a direction in which the inductance is the minimum, a high-frequency current having a q-axis high-frequency current amplitude $|i_{qh}|$ represented by Expression (13) is generated on the estimated "q" axis. In Expression (13), $V_h$ represents a voltage amplitude of the specific frequency component, $\omega_h$ represents a specific angular frequency, and $\Delta\theta$ denotes the rotor magnetic pole position error.

$$|i_{qh}| = \frac{V_h(L_q - L_d)}{2\omega_h L_d L_q}\sin 2\Delta\theta \quad (13)$$

As represented by Expression (13), a q-axis high-frequency current obtained by applying the specific frequency component includes the rotor magnetic pole position error Δθ. Thus, in the first embodiment, it is considered to calculate the rotor magnetic pole position error Δθ through detection of the q-axis high-frequency current including the specific frequency component.

The magnetic pole position estimated value $\hat{\theta}$ is used to convert the three-phase currents $i_u$, $i_v$, and $i_w$, which are the output of the current detection unit 10, to the currents $i_d$ and $i_q$ on the rotational coordinates defined by the "d" axis and the "q" axis rotating in synchronization with the rotational speed estimated value $\hat{\omega}_r$.

The converted q-axis current $i_q$ includes the specific high-frequency component. Thus, through use of a filter to cut a low-frequency component, it is possible to extract the q-axis high-frequency current amplitude $|i_{qh}|$ including the specific frequency component higher than the electrical angle frequency components in synchronization with the number of rotations. The rotor magnetic pole position error Δθ can be obtained through use of the q-axis high-frequency current amplitude $|i_{qh}|$ as represented by Expression (14).

$$\Delta\theta = -\sin^{-1}\left\{\frac{\omega_h L_d L_q}{V_h(L_q - L_d)}|i_{qh}|\right\} \tag{14}$$

As a specific configuration of the filter configured to extract the q-axis high-frequency current amplitude $|i_{qh}|$, a high-pass filter configured to cut the low-frequency component, a band-pass filter configured to extract the specific frequency component, or the like can be used.

Description is now given of a result of a comparison between related-art control and the control in the first embodiment at the time when the rotating machine is controlled through sensor-less control in a low-load region in which the current amplitude is small.

Figure 4:
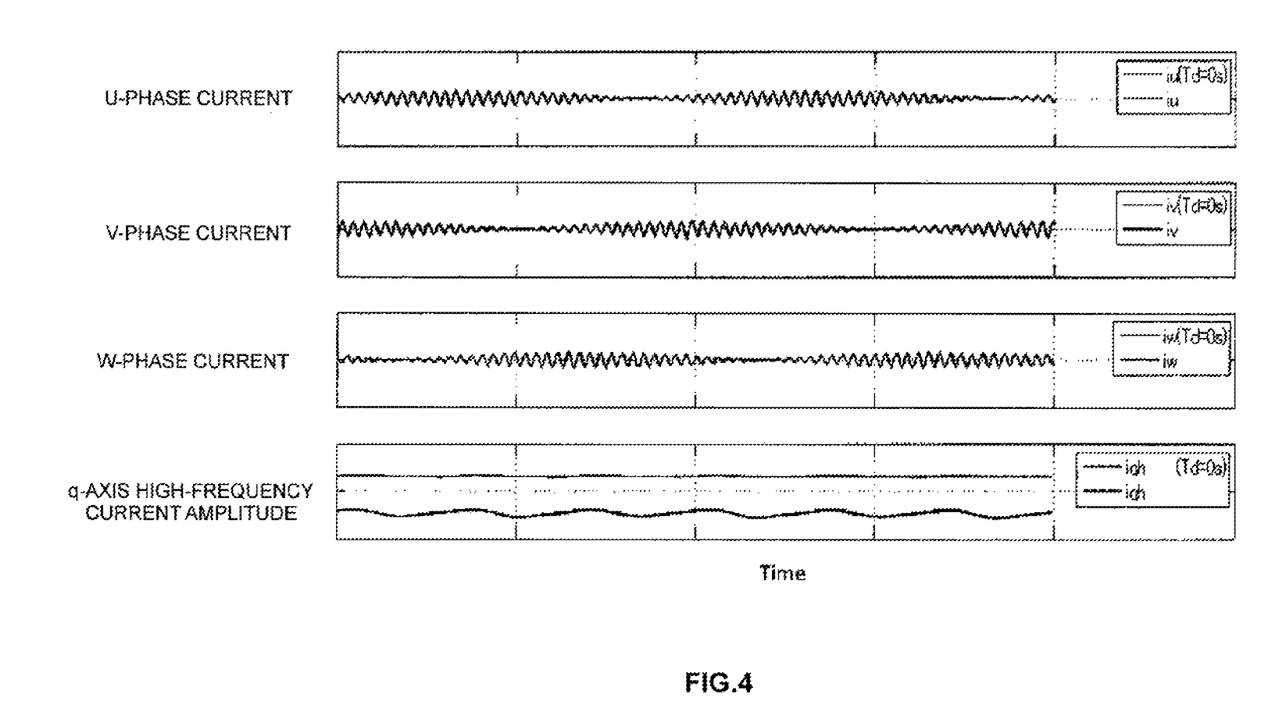
FIG. 4 is a graph for showing waveforms at a time when sensor-less control is executed in a low-load region by a related-art device.

FIG. 4 is a graph for showing waveforms at the time when the sensor-less control is executed by a related-art device in the low-load region. Specifically, in FIG. 4, four waveforms of the three-phase current waveforms and the q-axis high-frequency current amplitude $|i_{qh}|$ are shown while a horizontal axis indicates the time. Moreover, in FIG. 4, a result at the time when a deadtime is ideally set to 0 seconds is additionally shown together with each waveform.

From the waveforms of FIG. 4, it is understood that the waveform of the q-axis high-frequency current amplitude $|i_{qh}|$ caused by the rotor magnetic pole position error Δθ changes depending on whether or not the deadtime exists. That is, a voltage error caused by the dead time affects the q-axis high-frequency current amplitude $|i_{qh}|$.

As a result, in the low-load region in which the current amplitude is small, the estimation precision of the rotor position deteriorates due to an influence of the deterioration of the precision of the detection signals and the voltage error caused by the deadtime due to zero-crossing of the currents of the specific frequency component.

Figure 5:
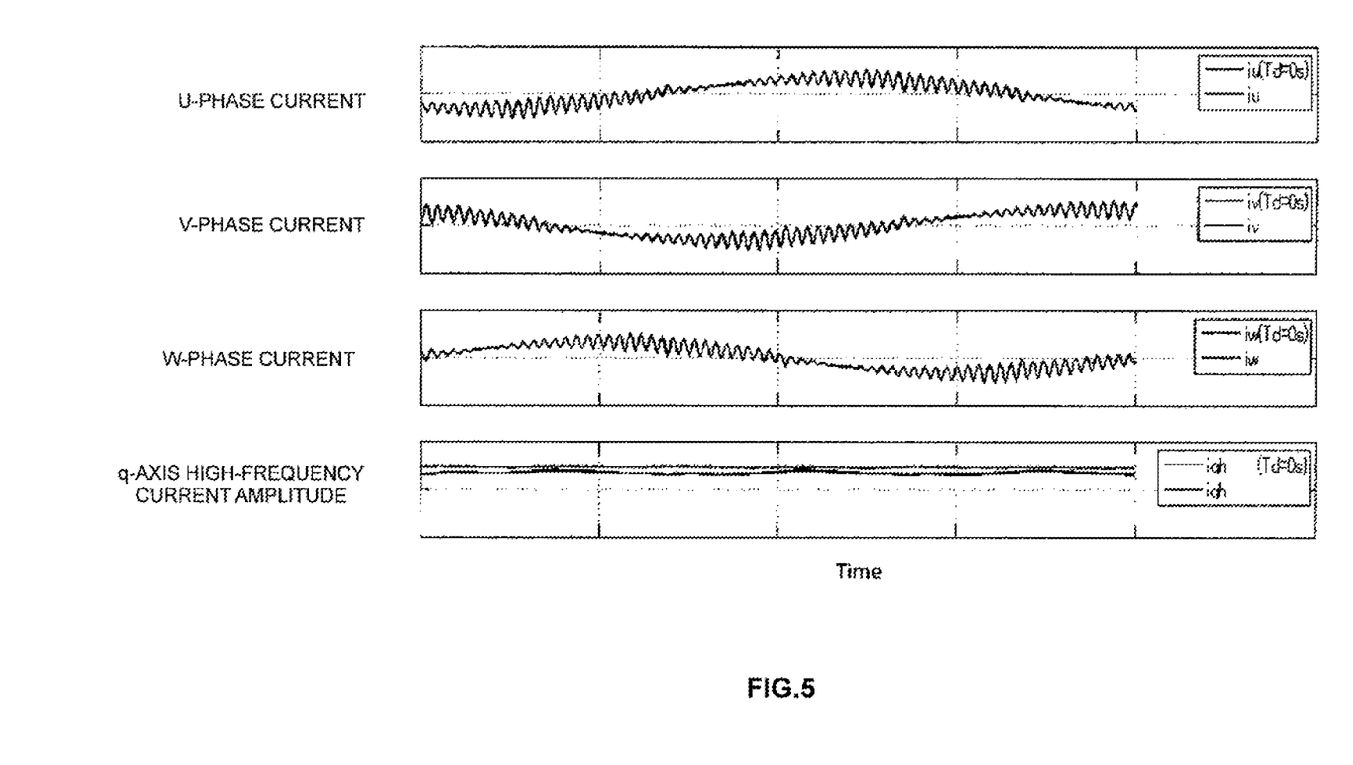
FIG. 5 is a graph for showing waveforms at a time when sensor-less control is executed in the low-load region by the control device for a rotating machine according to the first embodiment of the present invention.

Meanwhile, FIG. 5 is a graph for showing waveforms at the time when the sensor-less control is executed in the low-load region by the control device for a rotating machine according to the first embodiment of the present invention. Specifically, in FIG. 5, the four waveforms of the three-phase current waveforms and the q-axis high-frequency current amplitude $|i_{qh}|$ are shown while a horizontal axis indicates the time as in FIG. 4. Moreover, in FIG. 5, a result at the time when the deadtime is ideally set to 0 seconds is additionally shown together with each waveform.

The control in the first embodiment corrects the current commands so that the current amplitude of the electrical angle frequency components is equal to or larger than half of the high-frequency current amplitude used to estimate the magnetic pole position. Specifically, the difference value $\Delta i_h$, between the current amplitude of the electrical angle frequency components and the half of the current amplitude of the specific frequency component is calculated by the magnetic pole position estimation unit 20. Further, the correction amounts for the current commands are calculated by the current command correction unit 14 based on the difference value $\Delta i_h$.

The symbol $\Delta i_h$ can be represented by Expression (15) as the difference value between the current amplitude $If_{amp}$ of the electrical angle frequency components and the half of the current amplitude $Ih_{amp}$ of the specific frequency component.

$$\Delta i_h = If_{amp} - \tfrac{1}{2} \cdot Ih_{amp} \tag{15}$$

Figure 6:
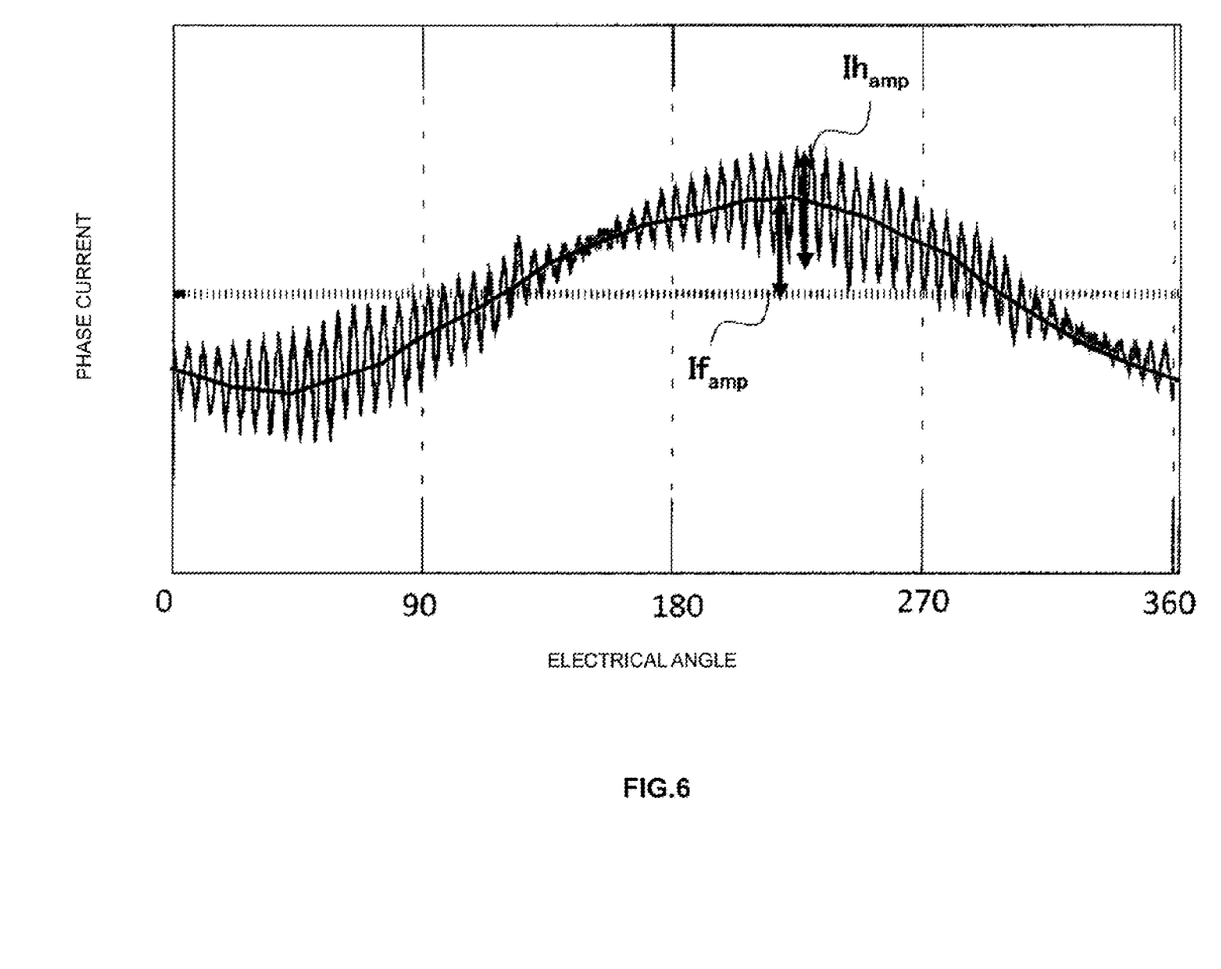
FIG. 6 is a graph for showing a relationship between a current amplitude of an electrical angle frequency component and a current amplitude of a specific frequency component in the first embodiment of the present invention.

FIG. 6 is a graph for showing a relationship between the current amplitude $If_{amp}$ of the electrical angle frequency components and the current amplitude $Ih_{amp}$ of the specific frequency component in the first embodiment of the present invention. The current amplitude $If_{amp}$ of the electrical angle frequency components may be calculated from the current command values or from the current values obtained from the current detection unit 10.

The current amplitude $Ih_{amp}$ of the specific frequency component may be obtained through use of a high-pass filter, a band-pass filter, or the like from the current values obtained from the current detection unit 10. The current amplitude $Ih_{amp}$ may be obtained through another method as long as the relationship with the $If_{amp}$ shown in FIG. 6 can be confirmed.

Figure 7:
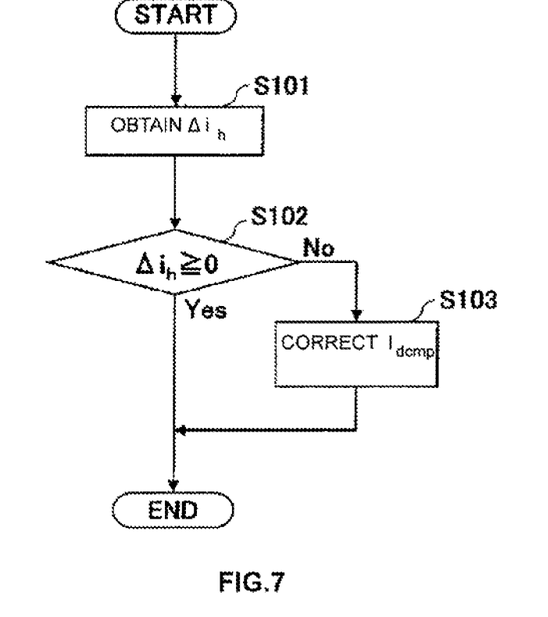
FIG. 7 is a flowchart relating to calculation processing for a current command correction amount executed by a current command correction unit in the first embodiment of the present invention.

A detailed description is given of the correction method for the current commands with reference to a flowchart. FIG. 7 is a flowchart relating to calculation processing for the current command correction amount executed by the current command correction unit 14 in the first embodiment of the present invention. First, in Step S101, the current command correction unit 14 obtains the difference value $\Delta i_h$ output from the magnetic pole position estimation unit 20.

Then, in Step S102, the current command correction unit 14 determines whether or not the difference value $\Delta i_h$ is equal to or larger than 0. When the difference value $\Delta i_h$ is smaller than 0, the current command correction unit 14 proceeds to Step S103, and corrects the d-axis current command correction amount $I_{dcmp}$. For example, when the rotating machine 1 is an interior permanent magnet synchronous motor (IPMSM) in which permanent magnets are embedded in a rotor, it is desired that the current command correction unit 14 correct the d-axis current command correction amount $I_{dcmp}$ to a negative value.

As illustrated in FIG. 1, the d-axis current command $I_d^*$ is generated by adding the d-axis current command correction amount $I_{dcmp}$ calculated by the current command correction unit 14 to the d-axis current command $I_{d0}^*$ calculated by the current command calculation unit 13. As a result, the control device for a rotating machine according to the first embodiment suppresses the voltage error caused by the deadtime due to the zero-crossing of the currents superimposed with the specific frequency component, to thereby be able to highly precisely estimate the magnetic pole position estimated value $\hat{\theta}$.

The respective functions of the current detection unit 10, the detection current vector calculation unit 11, the current command calculation unit 13, the current command correction unit 14, the current control unit 15, the voltage control unit 16, the magnetic pole position estimation unit 20, and the high-frequency voltage application unit 21, which are the components of the control device for a rotating machine according to the first embodiment, are implemented by a processing circuit.

The processing circuit may be dedicated hardware or a processor (also referred to as central processing unit (CPU), central processing device, processing device, calculation device, microprocessor, microcomputer, or digital signal processor (DSP)) configured to execute programs stored in a storage device.

As described above, the first embodiment can achieve the following effects.

In the low-load region in which the current amplitude is small, it is possible to suppress the influence of the deterioration of the estimation precision of the rotor position due to the deterioration of the precision of the detection signals or the voltage error caused by the deadtime due to the zero-crossing of the currents of the specific frequency component.

Further, it is possible to achieve the configuration that can be applied to various types of rotating machines and can easily estimate the rotor position highly precisely.

The current command correction unit corrects the d-axis current command toward the negative direction as required in accordance with at least one of the currents or the torque. As a result, in a rotating machine having saliency, the current commands calculated by the current command calculation unit can continuously be changed by adding the negative correction amount to the d-axis current command.

When the control device for a rotating machine according to the first embodiment is applied to a drive system for an electrically driven vehicle such as an electric vehicle or a hybrid vehicle, an increase in cost caused by mounting a position sensor can be suppressed, and a mounting space and a wiring space can easily be secured. Moreover, in a case in which the position sensor is used, even when the position sensor fails, the operation can be continued without stopping the rotating machine.

Second Embodiment

In a second embodiment, description is given of a case in which q-axis current correction by the current command correction unit 14 is also considered in addition to the d-axis current correction by the current command correction unit 14. The block diagram of the control device for a rotating machine according to the second embodiment is the same as FIG. 1 in the first embodiment. In the second embodiment, the calculation processing for the correction amounts by the current command correction unit 14 is different from that in the first embodiment. Thus, description is now given mainly of the different point.

Figure 8:
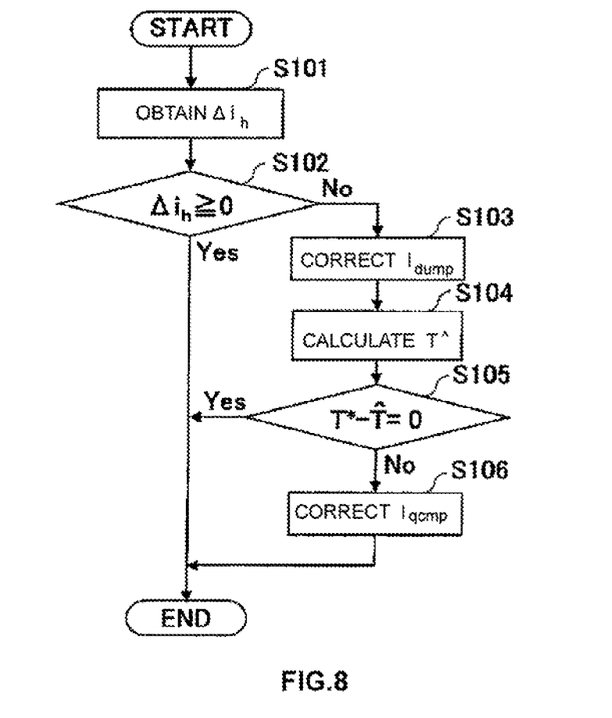
FIG. 8 is a flowchart relating to calculation processing for a current command correction amount executed by the current command correction unit in a second embodiment of the present invention.

FIG. 8 is a flowchart relating to calculation processing for the current command correction amount executed by the current command correction unit 14 in the second embodiment of the present invention. Details of processing in Step S101 to Step S103 are the same as details of the processing in Step S101 to Step S103 of FIG. 7, and description thereof is thus omitted.

In Step S104, to which the current command correction unit 14 has proceeded from Step S103, the current command correction unit 14 uses the d-axis current command correction amount $I_{dcmp}$ generated in Step S103 and motor parameters to calculate a torque estimated value T^. After that, in Step S105, the current command correction unit 14 calculates a difference between the torque command value T* and the torque estimated value T^, and determines whether or not the difference is 0.

When the difference of the torque does not exist, the current command correction unit 14 finishes a series of processing steps for the current command correction. Meanwhile, when a difference occurs in the torque, the current command correction unit 14 proceeds to Step S106. After that, in Step S106, the current command correction unit 14 corrects the q-axis current command correction amount $I_{qcmp}$ so that the difference of the torque approaches 0.

As illustrated in FIG. 1, the d-axis current command $I_d^*$ is generated by adding the d-axis current command correction amount $I_{dcmp}$ calculated by the current command correction unit 14 to the d-axis current command $I_{d0}^*$ calculated by the current command calculation unit 13. Moreover, as illustrated in FIG. 1, the q-axis current command $I_q^*$ is generated by adding the q-axis current command correction amount $I_{qcmp}$ calculated by the current command correction unit 14 to the q-axis current command $I_{q0}^*$ calculated by the current command calculation unit 13.

That is, the current command correction unit 14 executes the processing in Step S104 to Step S106, to thereby generate the q-axis current command correction amount Iqcmp to correct the q-axis current command $I_{q0}^*$ so that the rotating machine 1 achieves the desired torque based on the d-axis current command correction amount $I_{dcmp}$.

As a result, as in the first embodiment, the control device for a rotating machine according to the second embodiment suppresses the voltage error caused by the deadtime due to the zero-crossing of the currents superimposed with the specific frequency component, to thereby be able to highly precisely estimate the magnetic pole position estimated value θ^. Further, in accordance with the output torque changed due to the correction of the d-axis current command, the q-axis current command is corrected so as to be able to secure the torque precision.

In the first and second embodiments, description has been given of the case in which the magnetic pole position estimated value θ^ is estimated based on the currents of the specific frequency component of the rotating machine. However, the method for estimating the magnetic pole position estimated value which is performed by the control device for a rotating machine according to each embodiment is not limited to this estimation method. Through further provision of a torque detection unit configured to detect the output torque, it is also possible to estimate the magnetic pole position estimation unit based on the specific high-frequency component included in the output torque of the rotating machine.

Moreover, in the first and second embodiments, the control method performed by the control device for a rotating machine is described as the method for the sensor-less control that does not use a rotor position sensor such as an encoder or a resolver. However, the method performed by the control device for a rotating machine according to each embodiment is not limited to this control method. The control device for a rotating machine according to each embodiment can be applied in combination with a rotation position sensor in a configuration including the rotation position sensor. In the case in which the rotation position sensor is used in combination as described above, even when the rotation position sensor fails, the rotation position can be switched to the magnetic pole position estimated value θ^, to thereby be able to continue the control processing.

Further, the configurations of each of the embodiments are not limited to individual application, and may be applied in combination with the configurations of the other embodiments unless a conflict occurs.

REFERENCE SIGNS LIST 1 rotating machine, 2 inverter, 3 current sensor, 4 DC power supply, 10 current detection unit, 11 detection current vector calculation unit (vector calculation unit), 13 current command calculation unit, 14 current command correction unit, 15 current control unit, 16 voltage control unit, 20 magnetic pole position estimation unit, 21 high-frequency voltage application unit (voltage application unit), 201 state observation unit, 202 permanent-magnet magnetic-flux calculation unit, 701 coordinate converter, 702, 703 adder/subtractor, 704 integrator, 705 rotating-machine matrix calculator, 706 amplifier, 707 estimated current calculator, 710 speed identifier, 711 integrator

The invention claimed is:

1. A control device for a rotating machine, comprising:
a magnetic pole position estimation unit configured to estimate a position of a magnetic pole of a rotor based on a state quantity of the rotating machine;
a vector calculation unit configured to obtain a magnetic pole position estimated value which is an estimation result obtained by the magnetic pole position estimation unit, and to generate a d-axis current and a q-axis current based on a detection result of a phase current in each phase flowing through the rotating machine;
a current command correction unit configured to correct a first d-axis current command and a first q-axis current command, to thereby output a second d-axis current command and a second q-axis current command;
a current control unit configured to generate voltage commands on rotational coordinates so that the d-axis current matches the second d-axis current command and the q-axis current matches the second q-axis current command;
a voltage application unit configured to superimpose, on the voltage commands on the rotational coordinates, a high-frequency voltage including a specific frequency component at a high frequency with respect to electrical angle frequency components in synchronization with the number of rotations of the rotating machine; and
a voltage control unit which is configured to obtain the magnetic pole position estimated value, and to convert the voltage commands on the rotational coordinates after the superimposition by the voltage application unit to voltage commands on fixed coordinates, to thereby control voltages to be applied to the rotating machine,
wherein the magnetic pole position estimation unit is configured to estimate the position of the magnetic pole based on a state quantity of the specific frequency component, and
wherein the current command correction unit is configured to correct the first d-axis current command and the first q-axis current command so that a current amplitude of the electrical angle frequency components is equal to or larger than a half of a current amplitude of the specific frequency component, to thereby output the second d-axis current command and the second q-axis current command.

2. The control device for a rotating machine according to claim 1, wherein the magnetic pole position estimation unit is configured to obtain the detection result of the phase current in each phase flowing through the rotating machine as the state quantity, and to estimate the position of the magnetic pole based on the specific frequency component included in the detection result of the phase current in each phase.

3. The control device for a rotating machine according to claim 2, wherein the current command correction unit is configured to correct the first d-axis current command toward a negative direction in accordance with the detection result of the phase current in each phase.

4. The control device for a rotating machine according to claim 1, wherein the magnetic pole position estimation unit is configured to obtain a detection result of an output torque of the rotating machine as the state quantity, and to estimate the position of the magnetic pole based on the specific frequency component included in the detection result of the output torque.

5. The control device for a rotating machine according to claim 4, wherein the current command correction unit is configured to correct the first d-axis current command toward a negative direction in accordance with the detection result of the output torque.

6. The control device for a rotating machine according to claim 1, wherein the current command correction unit is configured to correct the first q-axis current command based on a correction amount of the first d-axis current command so that the rotating machine achieves a desired torque.

7. A control device for an electrically driven vehicle, comprising the control device for a rotating machine of claim 1.

* * * * *